US008563142B2

(12) United States Patent
Bossmann et al.

(10) Patent No.: US 8,563,142 B2
(45) Date of Patent: Oct. 22, 2013

(54) DUAL BRAZING ALLOY ELEMENT, PROCESS FOR PRODUCING IT AND USES THEREOF

(75) Inventors: Hans-Peter Bossmann, Lauchringen (DE); Alexander Schnell, Baden (CH)

(73) Assignee: Alstom Technology Ltd, Baden (CH)

( * ) Notice: Subject to any disclaimer, the term of this patent is extended or adjusted under 35 U.S.C. 154(b) by 96 days.

(21) Appl. No.: 13/248,132

(22) Filed: Sep. 29, 2011

(65) Prior Publication Data
US 2012/0063911 A1 Mar. 15, 2012

Related U.S. Application Data

(63) Continuation of application No. PCT/EP2010/053498, filed on Mar. 18, 2010.

(30) Foreign Application Priority Data

Mar. 31, 2009 (CH) ........................................ 0528/09

(51) Int. Cl.
*B32B 15/00* (2006.01)
*B23K 35/30* (2006.01)

(52) U.S. Cl.
USPC ........... 428/607; 428/621; 428/632; 428/680; 228/262.31; 228/122.1; 427/191; 427/250

(58) Field of Classification Search
None
See application file for complete search history.

(56) References Cited

U.S. PATENT DOCUMENTS

| 4,624,404 | A | | 11/1986 | Ohmae et al. | |
|---|---|---|---|---|---|
| 5,372,298 | A | | 12/1994 | Glaeser | |
| 5,523,169 | A | * | 6/1996 | Rafferty et al. | 428/551 |
| 6,221,513 | B1 | * | 4/2001 | Lasater | 428/629 |
| 6,434,946 | B1 | * | 8/2002 | Shaw et al. | 60/752 |
| 6,530,971 | B1 | * | 3/2003 | Cohen et al. | 75/254 |
| 6,541,075 | B2 | * | 4/2003 | Hasz et al. | 427/454 |
| 7,565,996 | B2 | | 7/2009 | Das | |
| 7,658,315 | B2 | * | 2/2010 | Budinger et al. | 228/246 |
| 8,235,275 | B1 | * | 8/2012 | Stankowski et al. | 228/56.3 |
| 2003/0177640 | A1 | * | 9/2003 | Marques et al. | 29/889.1 |
| 2003/0180143 | A1 | * | 9/2003 | Um et al. | 415/173.1 |

(Continued)

FOREIGN PATENT DOCUMENTS

| EP | 0038584 A1 | 10/1987 |
|---|---|---|
| EP | 1642667 A1 | 4/2006 |
| JP | 2002089201 A | 3/2002 |

OTHER PUBLICATIONS

European Patent Office, Search Report in Swiss Patent Application No. 00528/09 (Jul. 17, 2009).

(Continued)

*Primary Examiner* — John J Zimmerman
(74) *Attorney, Agent, or Firm* — Leydig, Voit & Mayer Ltd.

(57) ABSTRACT

A dual brazing alloy element for a materially integral connection of a ceramic surface to a metallic surface includes a first layer having a Ni-based brazing alloy with a Ni content of at least 50% by weight and having at least one component configured to lower a melting point of the Ni-based brazing alloy selected from the group consisting of Si, B, Mn, Sn and Ge. A second layer includes an active brazing alloy material having a total content of 1-15% by weight of at least one active element selected from the group consisting of Ti, Hf, Zr and V.

20 Claims, 2 Drawing Sheets

(56) References Cited

U.S. PATENT DOCUMENTS

| | | | |
|---|---|---|---|
| 2004/0134966 A1* | 7/2004 | Chang et al. | 228/56.3 |
| 2005/0166397 A1 | 8/2005 | Ng | |
| 2006/0071056 A1* | 4/2006 | Das | 228/245 |
| 2006/0108227 A1* | 5/2006 | Tiankanon et al. | 205/67 |
| 2008/0017694 A1* | 1/2008 | Schnell et al. | 228/119 |
| 2008/0304959 A1* | 12/2008 | Benoit et al. | 415/200 |
| 2009/0188590 A1* | 7/2009 | Hu et al. | 148/528 |

OTHER PUBLICATIONS

XP 002536241, abstract for JP 2002089201, retrieved Jul. 15, 2009.

European Patent Office, International Search Report in International Patent Application No. PCT/EP2010/053498 (Jun. 18, 2010).

* cited by examiner

DUAL BRAZING ALLOY ELEMENT, PROCESS FOR PRODUCING IT AND USES THEREOF

CROSS REFERENCE TO PRIOR APPLICATIONS

This application is a continuation of International Application No. PCT/EP2010/053498, filed on Mar. 18, 2010, which claims priority to Swiss Application No. CH 00528/09, filed on Mar. 31, 2009. The entire disclosure of both applications is incorporated by reference herein.

FIELD

The present invention relates to a multilayer dual brazing alloy element, a process for producing such a dual brazing alloy element, and uses and processes for making a materially integral connection between two elements made from different materials.

BACKGROUND

Brazing is used for the materially integral connection of elements, in this case, inter alia, also for the connection of ceramic to metallic elements. One problem in relation to such connections, particularly in the field of gas turbine applications, is the poor wetting behavior of common brazing alloys on ceramic surfaces, such as are used in regions exposed to the hot combustion gases of turbines.

One possible solution to the problem, resulting from this, of poor materially integral connection after the brazing process is to metalize the ceramic surface prior to brazing. However, this entails major disadvantages in technical and economic terms.

A further possibility is to use so-called active brazing alloys. Active brazing alloys are often employed for connecting ceramic to metallic structural elements. They are distinguished by a certain content of elements with high oxygen affinity, thereby affording for the first time the preconditions for the wettability of the surface of the ceramic body. The alloys employed in this case usually contain, for example, Ti, Hf, Zr, and/or V as active elements. The term "active" therefore means, in this context, that, during the brazing process, these elements react with the ceramic surface to form a reaction layer (for example, Ti forms a layer of $TiO_2$), this reaction layer being arranged between the ceramic element and the molten brazing alloy. This reaction layer acts as a connecting element between the ceramic and the brazing alloy.

Such commercial brazing alloys are typically based on Ag, Au, Cu, Ni or a mixture of the systems comprising Au/Ni and Ag/Cu, V or Ti normally being added in relatively small quantities as active element. These materials are generally applied to the ceramic brazed joint as foils or pastes or in powder form.

The problem with such brazing systems is their inherently low melting point $T_{mp}$, this greatly restricting the possibilities of use in the high-temperature range, that is to say, for example, in gas turbine applications. The melting points of the abovementioned brazing alloys are typically in the range of $T_{mp}$=780-960° C. for the Ag/Cu brazing alloys and $T_{mp}$=950-1050° C. for the Au/Ni brazing alloys. In such applications, the operating temperatures may enter the range of melting points or be even above these and therefore adversely influence the brazed joint. For gas turbine applications, a brazed connection has to withstand these high operating temperatures in the long term and always ensure a sufficient mechanical (materially integral) connection, this often not being the case with these brazing alloys.

The Cu- and Ni-containing brazing alloys are not resistant in the long term, in the combustion gas, to oxidation or corrosion caused by, for example, $O_2$, $H_2O$ and $SO_2$ constituents of the combustion gas. Active brazing alloys can be used as wire and foil material in the form of composition materials, for example as a eutectic Ag/Cu core with a Ti sheath or semifinished products laid one on the other and in each case composed of Ag or Zr. Furthermore, EP 0 038 584 A1 describes applying such materials on both sides to a brazing strip in the form of a sheet-like metal carrier (band) made from Cu or from a copper alloy.

There is also another group of active brazing alloys, to be precise those which are based on variable systems, such Pt—Cu—Ti ($T_{mp}$=1080-1770° C.) and Pd—Ni—Ti ($T_{mp}$=1080-1550° C.). This system has the disadvantage, however, of a very high melting point, this entailing problems with the metallic element to be connected.

To be precise, a high temperature during brazing entails undesirable variations in the microstructure particularly of superalloys (such as are used for components in gas turbine plants). These variations in microstructure often lead to mechanical weakening and fatigue. Moreover, such brazing alloys are generally less compatible with the customary Ni- and/or Co-based superalloys of the metallic components than are common Ni-based brazing alloys. This leads, for example with the aluminum of superalloys, to the formation of brittle intermetallic phases in the interdiffusion zone and consequently to a lower strength of the connection and, in general terms, to lower mechanical integrity of the hybrid system composed of the metallic element, ceramic element and brazing alloy lying between them.

SUMMARY OF THE INVENTION

In an embodiment, the present invention provides a dual brazing alloy element for a materially integral connection of a ceramic surface to a metallic surface. A first layer includes a Ni-based brazing alloy having a Ni content of at least 50% by weight and having at least one component configured to lower a melting point of the Ni-based brazing alloy selected from the group consisting of Si, B, Mn, Sn and Ge. A second layer includes an active brazing alloy material having a total content of 1-15% by weight of at least one active element selected from the group consisting of Ti, Hf, Zr and V.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
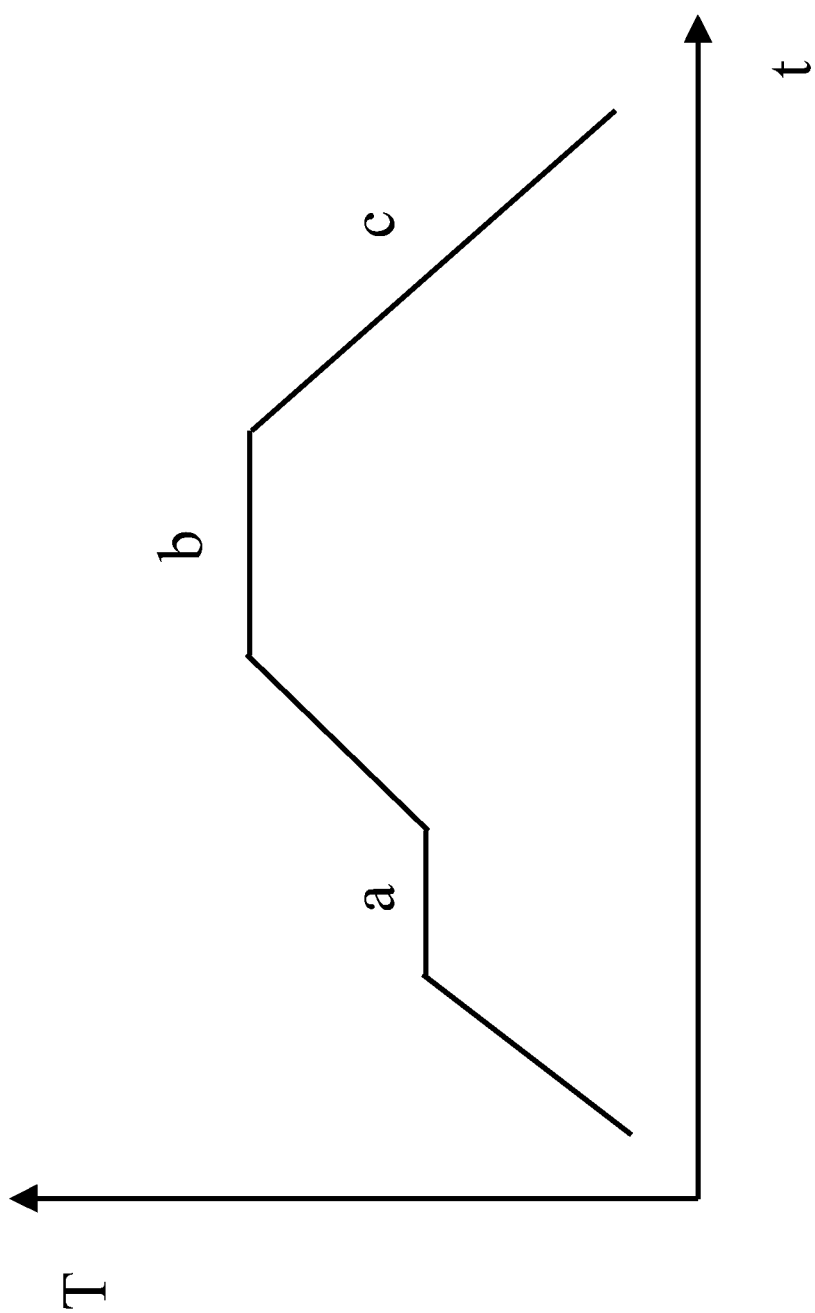
FIG. 1 shows a diagrammatic illustration of a temperature profile during a brazing operation, using an active brazing alloy according to the invention.

In an aspect of the present invention, an improved brazing alloy for the materially integral connection of a metallic element to a ceramic element is provided and also production processes and uses thereof.

In an embodiment, the invention relates to a dual brazing alloy element for the materially integral connection of a ceramic surface to a metallic surface, comprising at least one first layer (or foil) composed of an Ni-based brazing alloy containing at least one component that lowers the melting point and is selected from the group Si, B, Mn, Sn, Ge and having an Ni content of at least 50% by weight, and, in an arrangement separated physically, that is to say spatially, from it (for example, directly adjacent to one another), at least one second layer composed of or based on an active brazing alloy material with a content of active element selected from the group Ti, Hf, Zr, V of, in total, 1-15% by weight, preferably 3-10% by weight.

To be precise, there is a need for making available a Ni-based brazing alloy having the appropriate good compatibility with regard to said superalloys with an active element for reaction with the ceramic surface. The problem in this case is that the simple addition (in the sense of an admixture) of one or more active elements to such a Ni-based brazing alloy obviously does not exhibit the desired properties. Applicants recognized, then, that the problem of the insufficient effectiveness of such mixed systems is that the active element reacts with other components, such as, for example, B or Si, that lower the melting point of the brazing alloy. Such components that lower the melting point of the brazing alloy are necessary in order to bring the melting point of the Ni-based brazing alloy into a reasonable range of typically 900-1100° C. The problem in this case, however, is that the elements that lower the melting point of the brazing alloy, if they are present together with the active elements in the alloy, react with these. During the brazing process, therefore, the reactive active elements react with the components that lower the melting point of the brazing alloy and form with these high-temperature-stable phases, such as, for example, $TiB_2$, Ti silicides and the like. The effect of the two components is therefore reduced at the same time, that is to say, as a result of the removal of the active elements, the effective wetting of the ceramic surface is reduced, and, as a result of the removal of the components that lower the melting point of the brazing alloy, the melting point of the brazing alloy rises.

In an embodiment, the components in the Ni-based brazing alloy which lower the melting point of the brazing alloy are separated physically from the active elements such that, as it were, separate fusion or fusion partially or completely separated spatially and/or in time becomes possible without any appreciable negative interaction of the components with one another.

The question, therefore, is to employ physical separation and therefore also, because of the spacing apart occurring in this case, a certain chemical separation (no reaction between the active element and the components that lower the melting point) for solving the problem. That is to say, the dual brazing alloy element is separated into a first region (first layer) in which a nickel-based brazing alloy is arranged with the components that lower the melting point. This first region subsequently faces the metallic surface. In a second region (second layer) separate from this, the active element is arranged in a carrier material, this second region subsequently facing the ceramic surface.

In an embodiment, the first layer is therefore normally essentially or completely free of active elements.

There are therefore basically two approaches, to be precise:
a) the actual brazing alloy is presented in the form of a foil or block (first layer) and, separately from this, the active elements are introduced into a separate layer (foil) in the form of an alloy;
b) alloying or coating of a carrier material composed of the actual brazing alloy with the active element, the coating may in this case also be composed solely of the active element or active elements.

The main advantage of separating the active elements from the elements that lower the melting point is that, during heating to the brazing temperature, first that part of the active brazing alloy which contains the active element fuses. The active element is correspondingly exposed first and can wet the ceramic surface optimally.

This leads immediately to the formation of a corresponding M-oxide type (M=Ti, Hf, Zr, V) on the surface of the oxide ceramic. With increasing heating to the final maximum brazing temperature, the actual brazing alloy (first layer) is then fused completely and reacts with the metal surface and the oxides formed on the ceramic surface.

During subsequent cooling from the brazing temperature, the liquid layer of brazing alloy solidifies, thus leading to an intimate connection of the layers and ultimately to a strong materially integral connection between the metal surface and the ceramic surface.

This behavior is illustrated diagrammatically in FIG. 1, the region illustrated by a indicating that time segment in which that region of the brazing alloy in which the active element is arranged (second layer) fuses and releases the active element onto the surface of the ceramic. That time segment at the actual brazing temperature in which the rest of the brazing alloy fuses (first layer) is indicated by b. The cooling phase in which the brazed connection hardens and connects the metallic surface to the ceramic surface is illustrated by c.

According to a first preferred embodiment, the dual brazing alloy element is characterized in that it comprises only said first layer and said second layer, the first layer being designed to come into contact with the metallic surface, and the second layer being designed to come into contact with the ceramic surface. It is essential in this case that the first layer is capable of coming into contact with the metallic surface and the second layer is capable of coming into contact with the ceramic surface. Further intermediate layers may be arranged between the first and the second layer, but this is preferably not the case, that is to say the dual brazing alloy element is composed only of these two layers.

The first layer and the second layer may in this case be designed as individual foils which are joined together at the latest during the brazing process, the first foil then being arranged on the side of the metallic surface and the second foil on the side of the ceramic surface, and, as it were, the two surfaces being connected indirectly via these two foils. The foils may as it were be a kit of parts, which may have advantages in terms of processing because the individual foils may also, as it were, be laid in place individually, but they may also be connected to one another to achieve other benefits, thus, for example, at least in spots (for example, by spot welding), although connection over the entire area is also possible.

Alternatively, the first layer may be designed as a carrier layer and the second layer as a preferably only one-sided coating. Such a coating may be in the form of a vapor-deposited and/or sputtered-on coating.

The material of the first layer normally has a melting point in the range of 900-1200° C., preferably a melting point in the range of 1050-1150° C.

Preferably furthermore, the material of the second layer has a melting point in the range of 700-1100° C., preferably in the range of 900-1000° C.

A preferred feature is (particularly also with regard to the above-indicated ranges of melting points for the first layer and the second layer) that the melting point of the first layer is higher than that of the second layer. Preferably, the melting point of the first layer is in the range of 30-200 K higher than that of the second layer, preferably in the range of 50-100 K higher.

According to a further preferred embodiment, the second layer has a thickness in the range of 3-200 μm, preferably in the range of 20-100 μm.

According to a further preferred embodiment, the first layer has a thickness in the range of 50-1000 μm, preferably in the range of 300-600 μm.

With regard to the materially integral connection particularly in the field of gas turbine components, according to a further preferred embodiment it proves especially advantageous if the second layer is composed of an Ni-based brazing alloy with a content of active element selected from the group Ti, Hf, Zr, V of, in total, 3-10% by weight.

In the same respect, it is especially advantageous, particularly for oxidation and corrosion resistance in the combustion gas, if the first layer is an Ni-based brazing alloy with an Ni content of at least 50% by weight, to which further elements selected from the group Al, Cr, Ta, Co, Fe, Y and W are admixed, and, as components that lower the melting point, Mn, Sn, Ge, Si and/or B.

Furthermore, the present invention relates to a process for producing such an active brazing alloy element. Preferably, this process is characterized in that a coating is applied as a second layer on one side to a carrier foil composed of an Ni-based brazing alloy, the coating preferably being vapor-deposited and/or sputtered on in an essentially continuous process.

Moreover, the present invention relates to specific uses of such an element. In concrete terms, it relates to the use of a dual brazing alloy element, such as was described above, for connecting a metallic surface to a ceramic surface in a brazing process, in particular for the connection of components of a gas turbine.

Not least, however, the present invention also relates to processes for connecting a metal surface to a ceramic surface in a brazing process, using such a dual brazing alloy element. Such a process is preferably characterized in that such a dual brazing alloy element is introduced between the metal surface and the ceramic surface in such a way that the first layer faces the metal surface and the second layer faces the ceramic surface. Subsequently, with heat energy being supplied, the dual brazing alloy element is fused. It is then cooled either actively or passively so as to form a materially integral connection between the metal surface and the ceramic surface.

A preferred embodiment of such a process is characterized in that the metal surface is a high-temperature-resistant superalloy which is preferably Ni- and/or Co-based.

A further preferred embodiment of the process is characterized in that the ceramic surface is a ceramic heat protection layer, preferably an aluminum oxide-, magnesium oxide- or zirconium oxide-based ceramic.

The invention likewise embraces gas turbine components in which a ceramic element (for example, a coating or the like) is fastened, at least in regions, to the metal surface with the aid of a process, such as was described above, with the aid of a dual brazing alloy element, as described above.

Figure 2:
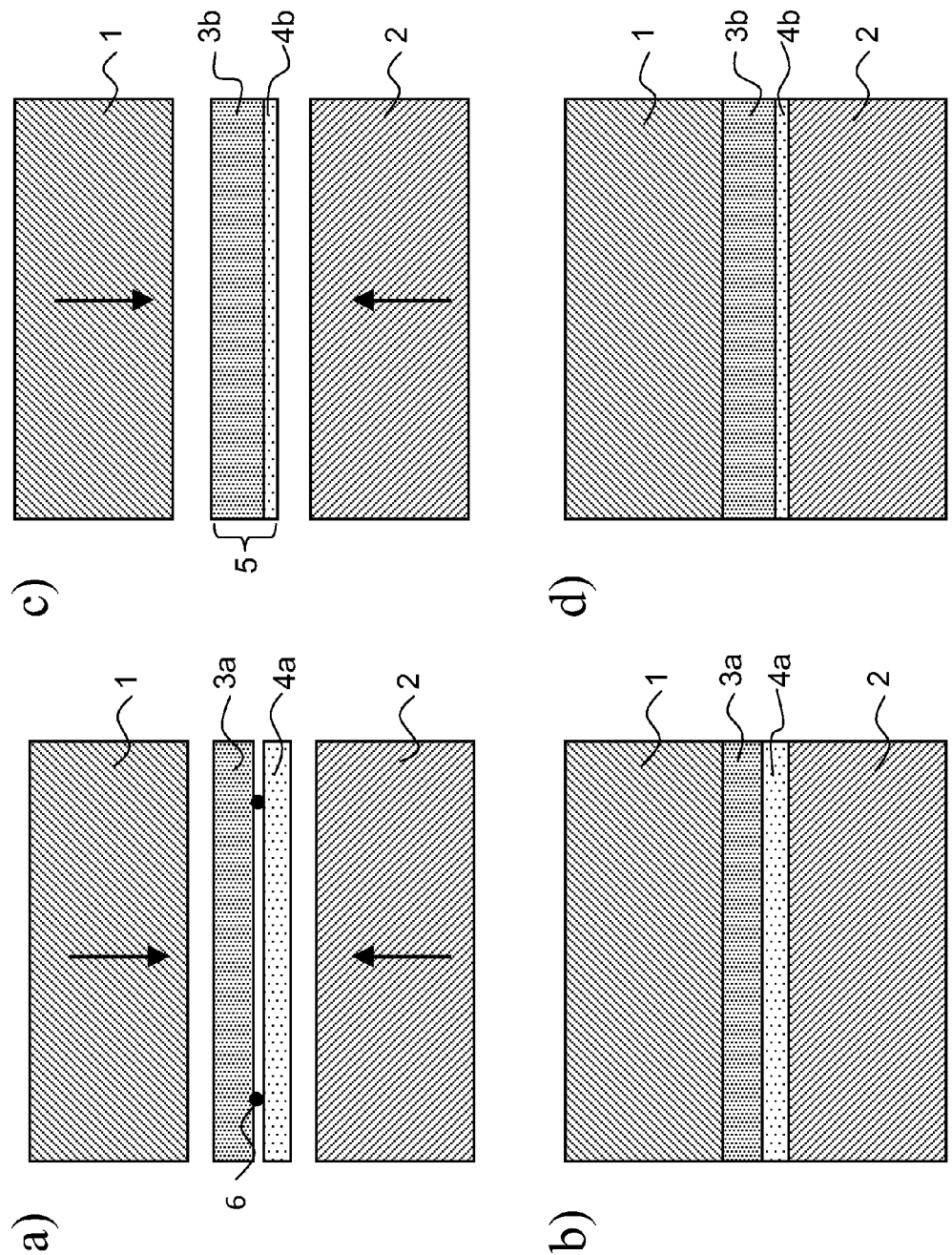
FIG. 2 shows the connection of a ceramic element to a metallic element in two exemplary embodiments, the first exemplary embodiment being illustrated before connection in a) and after connection in b), and the second exemplary embodiment being illustrated before connection in c) and after connection in d).

The dual brazing alloy element proposed in this document is used to connect a metal element 1 to a ceramic element 2, as is to be documented by the two exemplary embodiments illustrated in FIG. 2. In this case, the side of the dual brazing alloy element with the active brazing alloy and lower melting point faces the ceramic and the other side of the dual brazing alloy element with the higher melting point faces the metal.

For the uses aimed at here, the metal surface is typically a metallic component of a gas turbine which is exposed to high temperatures. Such metallic components are typically composed of superalloys which are cobalt- and/or nickel-based. Only when their microstructure is formed optimally do such superalloys also have the required thermal stabilities. Accordingly, critical temperatures also ought not to be exceeded during processing.

In the uses aimed at here, the ceramic elements are typically ceramic components, for example a ceramic blade tip which is brazed, for example, onto a metallic blade leaf.

In terms of the first exemplary embodiment illustrated in FIGS. 2a and b, it is to be shown how the dual brazing alloy element may be composed of two individual foils.

These are a nickel-based brazing alloy foil 3a and an activated brazing alloy foil 4a. These foils are present as individual foils and, as illustrated in FIG. 2a, are arranged, before the connection of the two elements 1 and 2, in the gap between these two elements, that is to say between the surfaces of these elements. In this case, the procedure is such that the nickel-based brazing alloy foil 3a is arranged on the side of the metal element and comes into contact with the surface of the latter, and the active brazing alloy foil 4a is arranged on the side of the ceramic element and comes into contact with the surface of the ceramic element.

The two foils are normally connected at least in spots or in strips, this being indicated diagrammatically in the figure by the connecting point 6.

A further foil or, for example, also an adhesive layer may theoretically also be arranged between the two foils 3a and 4a, although this is not necessary.

In other words, the two foils 3a may either first be connected to one another and then introduced into the gap between the two elements, or alternatively, however, it is also possible first to apply the foil 3 to the metal element 1 and fasten it temporarily to the latter and, subsequently or in parallel, apply activated brazing alloy foil 4a to the ceramic 2 and then feed the two elements toward one another and connect them to one another under the influence of heat, although another sequence of the individual steps may also be envisaged.

If, according to FIG. 2a, the two elements 1 and 2 are moved toward one another according to the arrows indicated in the figure and the brazing alloy is subsequently fused under the action of heat, then, as described further above, first the activated brazing alloy foil 4a with the lower melting point fuses and reacts with the surface of the ceramic optimally so as to form the corresponding oxides with the active elements. Only when an even higher temperature is reached does the nickel-based brazing alloy foil 3a also fuse, ultimately resulting in a materially integral connection, as illustrated in FIG. 2b. This, however, is a diagrammatic illustration, and typically the two layers 3a and 4a are fused one in the other and do not necessarily any longer have such a clearly separated layer structure with separate regions.

Alternatively, it is possible, as it were, to design the nickel-based layer as a carrier layer 3b which has a coating 4b of active brazing alloy on only one side, that is to say the side which at the end faces the ceramic component 2.

Such an exemplary embodiment is illustrated FIGS. 2c and d.

Subsequently, as in FIG. 2c, such an asymmetric element is introduced between the two surfaces in such a way that the active brazing alloy layer faces the ceramic component. When these parts are subsequently moved toward one another along the arrows similarly to above, and the brazing alloy is fused under the action of heat, once again the active brazing alloy layer will first fuse, wet the ceramic surface and form the corresponding oxides, and only when a higher temperature is reached will the nickel-based brazing alloy layer 3b also fuse and subsequently, after cooling, form a strong materially integral connection between the metal element 1 and the ceramic element 2.

In another approach, it is possible, for example, to coat (for example, vapor-deposit or sputter on) nickel-based materials, such as were indicated above and which contain the components that lower the melting point, on the surface with the active element or with a combination of active element and, for example, nickel, this then leading to a defined layer of active element and, if appropriate, further components (for example, a defined titanium-nickel layer) on one surface of the nickel-based brazing alloy layer 3b. This side coated with active metal will subsequently face the ceramic, as illustrated in FIGS. 2c and d Thinner active elements/nickel layers than in the approach according to FIG. 2a or b may be used here, because the corresponding layer 4b does not have to perform a carrying function. Nevertheless, such a thin layer can efficiently perform the task of wetting the ceramic surface, and it is therefore possible to keep the use of active element as low as is just necessary.

An alternative is for the nickel-based brazing alloy layer 3b to be mechanically alloyed superficially with a titanium/nickel layer.

While the invention has been described with reference to particular embodiments thereof, it will be understood by those having ordinary skill the art that various changes may be made therein without departing from the scope and spirit of the invention. Further, the present invention is not limited to the embodiments described herein; reference should be had to the appended claims.

LIST OF REFERENCE SYMBOLS

1 Metal element
2 Ceramic element
3a Nickel-based brazing alloy foil
3b Nickel-based brazing alloy layer
4a Active brazing alloy foil
4b Active brazing alloy layer
5 Dual brazing alloy element
6 Connecting point

What is claimed is:

1. A dual brazing alloy element, consisting essentially of:
a first layer including (i) a Ni-based brazing alloy having a Ni content of at least 50% by weight and (ii) at least one component which lowers a melting point of the Ni-based brazing alloy selected from the group consisting of Si, B, Mn, Sn, and Ge; and
a second layer including an active brazing alloy material having a total content of 1-15% by weight of at least one active element selected from the group consisting of Ti, Hf, Zr, and V,
wherein the dual brazing alloy element is suitable to provide a materially integral connection of a ceramic surface to a metallic surface,
wherein the first layer is configured to contact the metallic surface,
wherein the second layer is configured to contact the ceramic surface,
wherein a first layer melting point is in a range of from 900 to 1150° C.,
wherein a second layer melting point is in a range of from 700 to 1000° C., and
wherein the first layer melting point is in a range of from 30 to 200° C. higher than the second layer melting point.

2. The dual brazing alloy element as recited in claim 1, consisting of the first layer and the second layer.

3. The dual brazing alloy element as recited in claim 1, wherein the first layer and the second layer are configured as individual foils joined together at least one of before and during a brazing process.

4. The dual brazing alloy element as recited in claim 3, wherein the first layer and the second layer are connected to one another at least in spots.

5. The dual brazing alloy element as recited in claim 1, wherein the first layer is configured as a carrier layer and the second layer is configured as a coating disposed only on one side of the carrier layer.

6. The dual brazing alloy element as recited in claim 5, wherein the coating is at least one of vapor-deposited and sputtered-on.

7. The dual brazing alloy element as recited in claim 1, wherein the first layer melting point is in a range of from 1050 to 1150° C.

8. The dual brazing alloy element as recited in claim 1, wherein the second layer melting point is in a range of from 900 to 1000° C.

9. The dual brazing alloy element as recited in claim 1, wherein a thickness of the second layer is in a range of 3-200 μm.

10. The dual brazing alloy element as recited in claim 1, wherein a thickness of the first layer is in a range of 50-1000 μm.

11. The dual brazing alloy element as recited in claim 1, wherein the active brazing alloy material of the second layer includes a Ni-based brazing alloy having a total content of 3-10% by weight of the at least one active element.

12. The dual brazing alloy element as recited in claim 1, wherein the second layer includes at least one of an Au-, an Ag- and a Pd-based brazing alloy.

13. The dual brazing alloy element as recited in claim 1, wherein the first layer includes at least one element selected from the group consisting of Al, Cr, Fe, Ta, Co, Y and W admixed therein.

14. The dual brazing alloy element as recited in claim 1, wherein the first layer is configured as a carrier foil and includes at least one element selected from the group consisting of Al, C, Cr, Fe, Ta, Co, Y and W admixed therein, and wherein the second layer is configured as a coating disposed only on one side of the carrier foil.

15. A gas turbine component, comprising
a ceramic element; and
a metal surface,
wherein the ceramic element is fastened, at least in a region, to the metal surface by brazing with the dual brazing alloy element of claim 1.

16. The dual brazing alloy element as recited in claim 1, wherein the component (ii) of the first layer includes Mn.

17. A method for producing a dual brazing alloy element for a materially integral connection of a ceramic surface to a metallic surface, the method comprising:
providing a carrier foil including (i) a Ni-based brazing alloy having a Ni content of at least 50% by weight and (ii) at least one component which lowers a melting point of the Ni-based brazing alloy selected from the group consisting of Si, B, Mn, Sn, and Ge; and applying a coating to one side of the carrier foil, the coating including an active brazing alloy material having a total content of 1-15% by weight of at least one active element selected from the group consisting of Ti, Hf, Zr, and V, wherein the coating is applied by at least one of a vapor-depositing and sputtering in an essentially continuous process, to obtain a dual brazing alloy element, consisting essentially of the carrier foil and the coating, wherein the carrier foil is configured to contact the metallic surface, wherein the coating is configured to contact the ceramic surface, wherein a carrier foil melting point is in a range of from 900 to 1150° C., wherein a coating melting point is in a range of from 700 to 1000° C., and wherein the carrier foil melting point is in a range of from 30 to 200° C. higher than the coating melting point.

18. A method for producing a dual brazing alloy element for a materially integral connection of a ceramic surface to a metallic surface, the method comprising:

providing a carrier foil including (i) a Ni-based brazing alloy having a Ni content of at least 50% by weight and (ii) at least one component which lowers a melting point of the Ni-based brazing alloy selected from the group consisting of Si, B, Mn, Sn, and Ge; and applying a coating, in powder form, to one side of the carrier foil, the coating including an active brazing alloy material having a total content of 1-15% by weight of at least one active element selected from the group consisting of Ti, Hf, Zr, and V; and treating the coating mechanically by rolling, mechanically be pressing, thermally using a laser, thermally using heat radiation, thermally using inductive heating, or a combination of these, to obtain a dual brazing alloy element, consisting essentially of the carrier foil and the coating, wherein the carrier foil is configured to contact the metallic surface, wherein the coating is configured to contact the ceramic surface, wherein a carrier foil melting point is in a range of from 900 to 1150° C., wherein a coating melting point is in a range of from 700 to 1000° C., and wherein the carrier foil melting point is in a range of from 30 to 200° C. higher than the coating melting point.

19. A method for connecting a metal surface to a ceramic surface by brazing, the method comprising:

providing a dual brazing alloy element between a metal surface and a ceramic surface such that a first layer of the dual brazing alloy element faces the metal surface and a second layer of the dual brazing alloy element faces the ceramic surface;

supplying a heat energy so as to fuse the dual brazing alloy element; and cooling the dual brazing alloy element so as to form a materially integral connection between the metal surface and ceramic surface, wherein the dual brazing alloy element consists essentially of the first layer and the second layer, wherein the first layer includes (i) a Ni-based brazing alloy having a Ni content of at least 50% by weight and (ii) at least one component which lowers a melting point of the Ni-based brazing alloy selected from the group consisting of Si, B, Mn, Sn, and Ge, wherein the second layer includes an active brazing alloy material having a total content of 1-15% by weight of at least one active element selected from the group consisting of Ti, Hf, Zr, and V, wherein a first layer melting point is in a range of from 900 to 1150° C., wherein a second layer melting point is in a range of from 700 to 1000° C., and wherein the first layer melting point is in a range of from 30 to 200° C. higher than the second layer melting point.

20. The method as recited in claim 19, wherein the metal surface is at least one of a Ni- and a Co-based high-temperature-resistant superalloy and the ceramic surface is an yttrium-stabilized zirconium-based (YSZ) ceramic heat protection layer.

* * * * *